United States Patent [19]
Mead et al.

[11] Patent Number: 5,482,794
[45] Date of Patent: Jan. 9, 1996

[54] SINGLE POINT BATTERY WATERING SYSTEM WITH INLET MOUNTING BRACKET

[76] Inventors: Dennis Mead, 9 Meetinghouse Rd., Keene, N.H. 03431; Edward C. Ackroyd, 78 Thompson Lake Rd., East Berne, N.Y. 12059; Thomas J. Gemmell, R.R. 2 Box 143-E, Peterborough, N.H. 03458

[21] Appl. No.: 391,014
[22] Filed: Feb. 21, 1995
[51] Int. Cl.[6] .................................................... H01M 2/36
[52] U.S. Cl. ................... 429/73; 429/72; 429/74
[58] Field of Search ................... 429/72, 73, 74, 429/63, 80, 81; 248/65, 74.1

[56] References Cited

U.S. PATENT DOCUMENTS 199,684    1/1878    Beattie .
2,662,108  12/1953   Coates .................................. 429/73
5,215,281   6/1993   Sherman ............................. 248/74.1

Primary Examiner—Stephen Kalafut
Assistant Examiner—Richard H. Lilley, Jr.
Attorney, Agent, or Firm—Sughrue, Mion, Zinn, Macpeak & Seas

[57] ABSTRACT

A single point watering system for a battery having a plurality of cells is provided with a bracket secured to an end wall of a battery casing in overlying spaced relation to an upper surface of at least one cell of the battery. A clamp is provided for securing an inlet fitting on the filler tube of the single point watering system to the underside of the bracket for securely positioning the inlet fitting in a protected, readily accessible location for quick connection and disconnection with a water supply system.

3 Claims, 2 Drawing Sheets

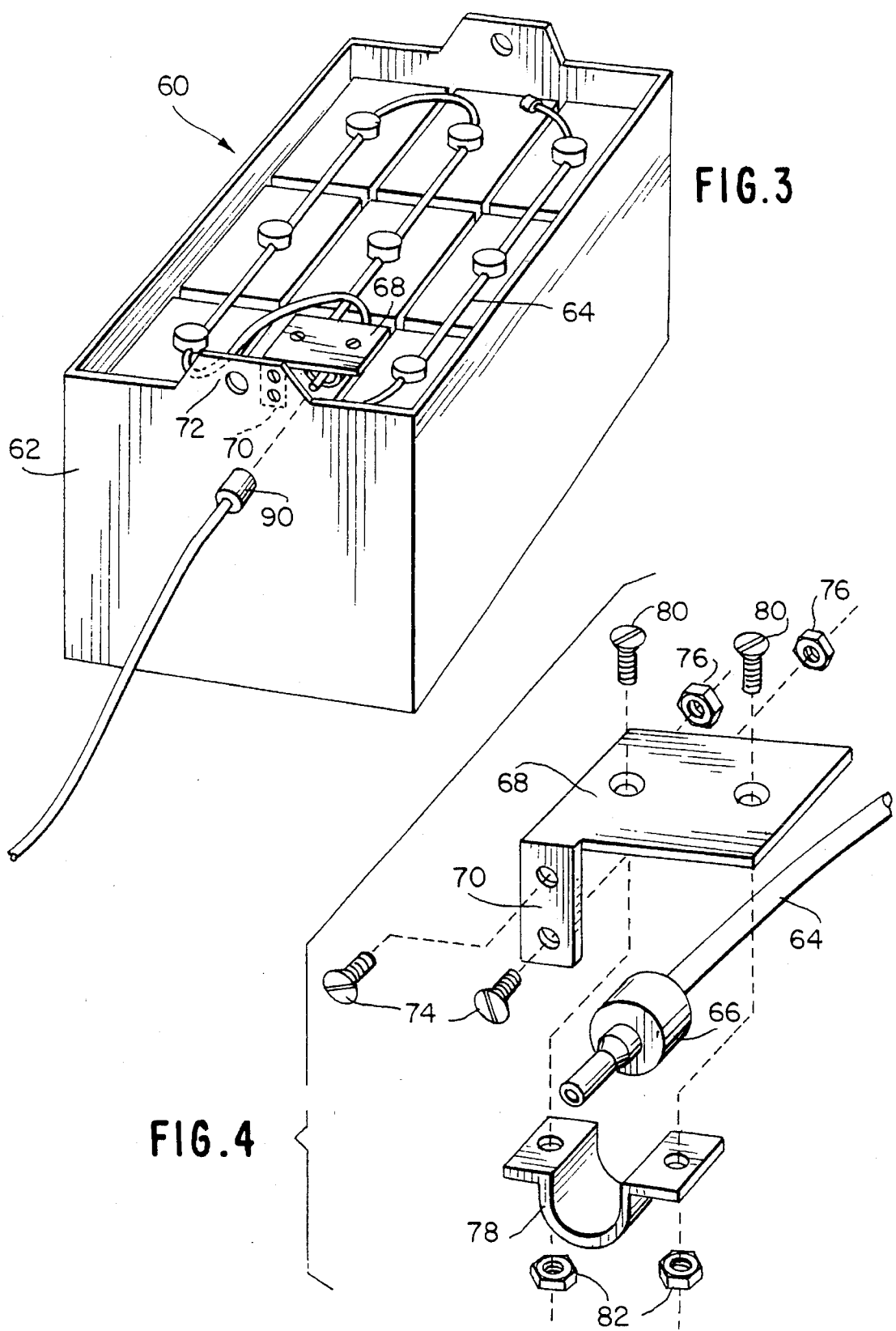

SINGLE POINT BATTERY WATERING SYSTEM WITH INLET MOUNTING BRACKET

BACKGROUND OF THE INVENTION

The present invention is directed to a single point watering system having a bracket for attachment to the battery casing and a clamp for securing the inlet fitting to the underside of the bracket with the inlet fitting disposed for ready connection to an external refill system.

Electrically powered vehicles such as forklift trucks and pallet jacks are extensively used in warehouses for moving materials about the warehouse. Such electrically powered vehicles are generally provided with a plurality of large multi-cell batteries which are often stacked 3 or 4 high on the vehicle. Such batteries normally require weekly maintenance which involves watering all of the cells of the battery. Such maintenance can be very time consuming in view of the large number of battery powered vehicles in an average sized warehouse.

Normally, the battery must be pulled from the truck if the battery is not equipped with a single point watering system. Even batteries equipped with a single point watering system must be manually moved out slightly in order to enable the single point watering tubing to be unfolded for connection to a supply source. Single point watering systems for batteries are old and well known and are usually comprised of a continuous length tube with cell connectors periodically inserted therein for connection to each cell of the battery. Each cell connector usually includes a built in filter and a level sensing mechanism for automatically stopping the flow of water to the cell when the water reaches the desired level in the cell. One end of the tube is provided with a quick release snap-on connector for connecting the single point watering system to a transportable water supply system. Generally, the end of the tubing having the quick release connector thereon is folded over the top of the cells within the battery case when not in use. Such folding and unfolding of the tubing can frequently lead to damage of the tubing. Additionally, the free end of the tubing can fall outside of the casing where it is susceptible to damage upon contact with objects during the travel of the vehicle about the warehouse.

Other types of battery filling devices utilize complicated built in arrangements where in the fluid passages are formed in each cell cover and mate with the fluid passages in adjacent cell covers to provide a continuous flow of water to each battery cell. Inlet and outlet fittings are secured in recesses in the handles of the battery casing. Such a battery filling arrangement is very complicated and expensive inasmuch as each of the cell covers has to be custom molded with the necessary passages and the alignment of the passages for adjacent cell covers is often difficult to achieve. Watering systems of this type are disclosed in the U.S. Patents to Van Meter Jr. (U.S. Pat. No. 1,996,843) and Ihlenburg (U.S. Pat. No. 3,481,793).

SUMMARY OF THE INVENTION

The present invention provides a new and improved single point battery watering system of the type having a continuous tube interconnecting a filler tube of each cell in sequence wherein an inlet fitting on one end of the tube is mounted on the underside of a bracket secured to an end wall of the casing in overlying spaced relation to a cell of the battery for quick connection to and disconnection from a water supply without having to manipulate the tubing or without having to move the battery.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 3 is a perspective view of a battery having an open top casing with a single point watering system according to the present invention.

FIG. 4 is an exploded view of the bracket assembly for mounting the inlet of a single point watering system according to the present invention.

DETAILED DESCRIPTION OF THE INVENTION

Figure 1:
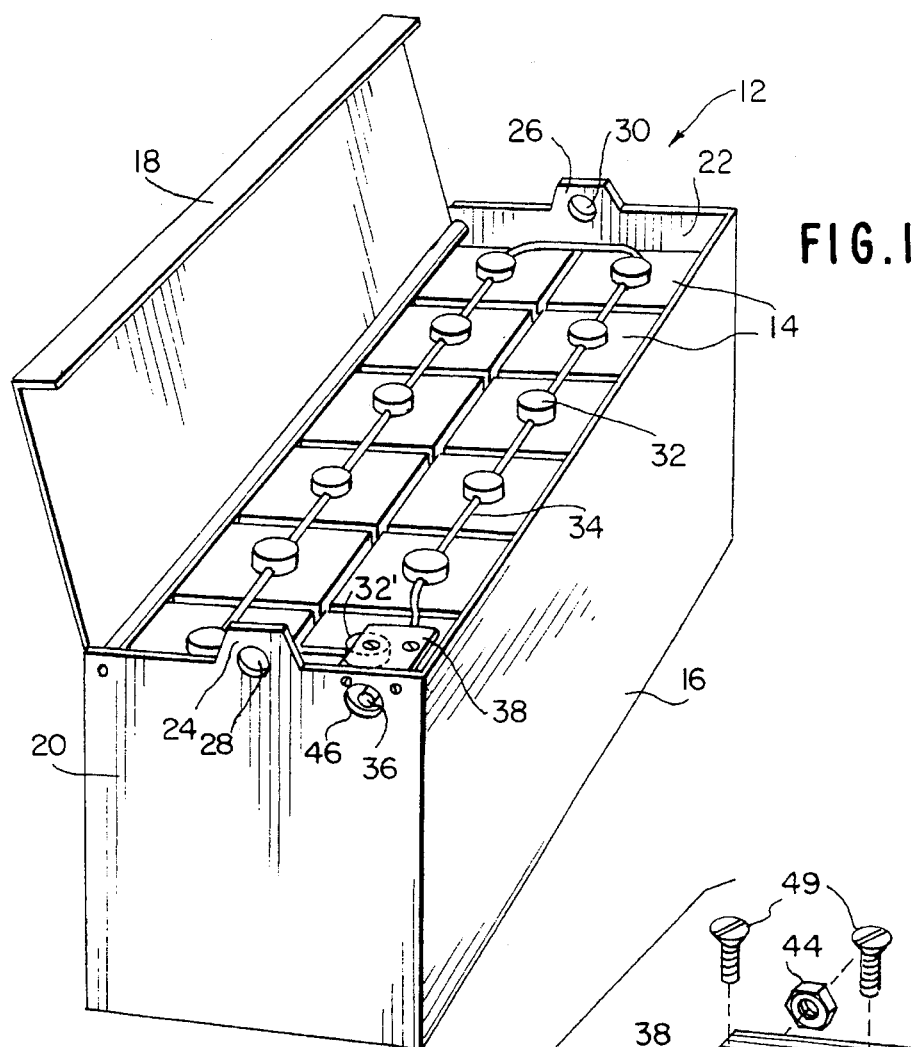
FIG. 1 is a perspective view of a battery having a case with a cover and a single point watering system according to the present invention.

The battery 12, shown in FIG. 1, is comprised of twelve cells 14 mounted in a casing 16 having a pivoted cover 18 connected to overlie the tops of the cells 14 in order to protect the tubing of a single point watering system and/or to permit stacking of batteries on top of each other. The end walls 20 and 22 of the battery case are provided with extended portions 24 and 26, respectively, each of which is provided with an aperture 28 and 30, respectively, in which hooks may be engaged for the purpose of lifting the batteries.

Figure 2:
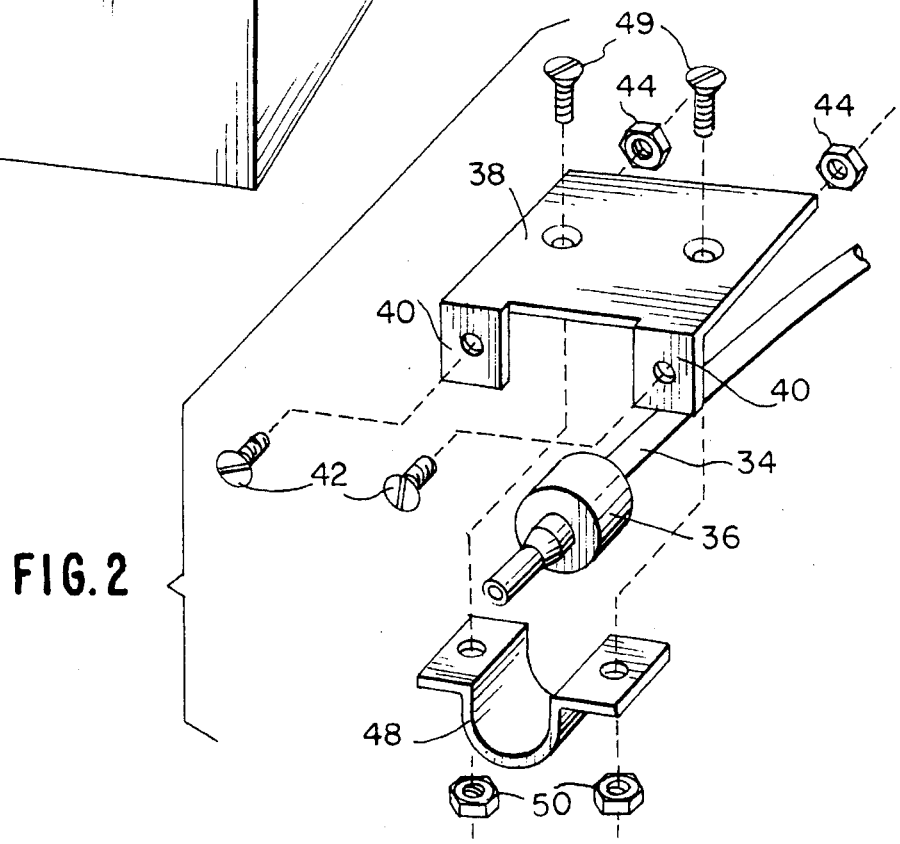
FIG. 2 is an exploded view of the bracket assembly for securing the inlet of the single point watering system according to FIG. 1.

Each cell 14 is provided with a filler cap 32 of conventional design. Each filler cap 32 is connected in series by means of a plastic tube 34 which terminates at the filler cap 32'. The inlet end of the tube 34 is provided with an inlet fitting 36 which is best seen in FIG. 2. The inlet fitting 36 is a conventional quick disconnect fitting for coupling with a complementary fitting on a water supply system (not shown). The details of the single point watering system as disclosed in the present application is conventional and accordingly, does not have to be described in detail.

In order to rigidly mount the inlet fitting 36 in an accessible protected position for connection to a water supply system, a bracket 38 is secured to the end wall 20 of the battery case in overlying relation to the upper surface of the adjacent cell 14. The bracket is preferably made of reinforced fiberglass having a pair of tabs 40 which are formed integrally therewith and extend at right angles to the main portion of the bracket. The bracket 38 is secured to the end wall 20 of the housing by means of two stainless steel machine bolts 42 and nylon centered lug nuts 44. An opening 46 is formed in the end wall 20 above the top of the adjacent cell between the tabs 40 to provide access to the inlet fitting 36 of the tubing 34. The inlet fitting 36 is secured to the underside of the bracket 38 by means of a U-shaped plastic clamp 48 which is secured at opposite ends to the bracket 38 by means of stainless steel machine screws 49 and nylon centered lug nuts 50. Thus the inlet fitting 36 is readily accessible through the aperture 46 and is rigidly mounted in a protected location within the confines of the battery casing. Thus there is no danger of any damage to the inlet fitting and the water supply system can readily be connected to the single point watering system without having to move the batteries or manipulate the single point watering system in any way whatsoever.

The battery 60 as shown in FIG. 3, is also provided with a battery case 62 but does not have a cover thereon. The single point watering system having a continuous tube 64 interconnecting the filler caps of each cell is also conventional and similar to the system shown in FIGS. 1 and 2. However, since the casing is not provided with a cover, the modified bracket assembly for mounting the inlet fitting 66 is of slightly different construction. As shown in FIGS. 3 and 4, the bracket 68 is provided with a single tab 70 disposed at right angles to the main body 68. Once again, the bracket may be of reinforced fiberglass which is secured to the upstanding gripping portion 72 on one end wall of the battery casing by means of two stainless steel machine bolts 74 and nylon centered lug nuts 76. The inlet fitting 76 of the single point watering system is secured to the underside of the bracket 68 by means of a plastic U-shaped clamp 78 by means of stainless steel machine screws 80 and nylon centered lug nuts 82. Once again, the inlet fitting 66 is held in a protected location within the confines of the battery casing 62.

The bracket in both embodiments as well as the clamp, may be made of any suitable material and the exact configuration of each bracket may vary slightly depending upon the exact configuration of the battery casing. The details of the single point watering system may vary considerably as long as the inlet fitting for a single point watering system is securely mounted on the underside of the bracket in a fixed position for easy coupling to a water supply system. Such a water supply system could have a complementary fitting 90 as shown in FIG. 3 which would be compatible with the inlet fitting of the single point watering system.

While the invention has been particularly shown and described with reference to preferred embodiments thereof, it will be understood by those in the art that the foregoing and other changes in form and details may be made therein without departing from the spirit and scope of the invention.

What is claimed is:

1. A single point watering system for a battery having a plurality of cells, comprising a continuous tube interconnecting said cells of the battery, a battery casing having at least one end wall having a portion thereof extending above an upper surface of said cells, bracket means secured to said portion of said end wall and overlying at least one cell of the battery wherein said single point watering system is provided with an inlet fitting on said tube and clamping means are provided for securing said inlet fitting to said bracket means.

2. A system as set forth in claim 1, wherein said bracket means is comprised of a flat plate having an at least one mounting tab integral therewith and extending at right angles thereto, securing means for securing said at least one tab to said portion of said end wall with said flat plate disposed in parallel spaced relation to an upper surface of said at least one cell whereby said inlet fitting is secured to said bracket between said plate and said cell.

3. A system as set forth in claim 2, further comprising at least one aperture formed in said end wall in alignment with said inlet fitting.

* * * * *